(12) United States Patent
Smith et al.

(10) Patent No.: US 11,649,873 B1
(45) Date of Patent: May 16, 2023

(54) USER-ADJUSTABLE MULTI-STAGE SHOCK ABSORBERS

(71) Applicants: ThyssenKrupp Bilstein of America, Inc., Hamilton, OH (US); thyssenkrupp AG, Essen (DE)

(72) Inventors: Justin Smith, San Diego, CA (US); Blake Ramuno, Oceanside, CA (US); Austin Dvorak, Carlsbad, CA (US)

(73) Assignees: THYSSENKRUPP BILSTEIN OF AMERICA, INC., Hamilton, OH (US); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/584,751

(22) Filed: Jan. 26, 2022

(51) Int. Cl.
 *F16F 9/44* (2006.01)
 *F16F 9/22* (2006.01)
 *F16F 9/49* (2006.01)

(52) U.S. Cl.
 CPC ............... *F16F 9/446* (2013.01); *F16F 9/22* (2013.01); *F16F 9/49* (2013.01); *F16F 2230/186* (2013.01)

(58) Field of Classification Search
 CPC ...... F16F 9/22; F16F 9/44; F16F 9/446; F16F 9/49; F16F 9/48; F16F 2230/186
 USPC .................................... 188/314, 319.1, 319.2
 See application file for complete search history.

(56) References Cited

U.S. PATENT DOCUMENTS

| | | | | |
|---|---|---|---|---|
| 4,307,874 A | * | 12/1981 | Reuschenbach | F16F 9/49 188/300 |
| 5,224,689 A | * | 7/1993 | Georgiev | B60G 11/14 267/225 |
| 6,814,193 B2 | * | 11/2004 | Grundei | F16F 9/061 188/322.22 |
| 7,975,994 B2 | * | 7/2011 | Born | F16F 9/483 267/226 |
| 8,162,112 B2 | * | 4/2012 | Gartner | F16F 9/49 188/289 |
| 9,091,320 B1 | | 7/2015 | Smith et al. | |
| 9,695,899 B2 | * | 7/2017 | Smith | F16F 9/22 |
| 9,822,837 B2 | * | 11/2017 | Groves | B60G 13/08 |

(Continued)

OTHER PUBLICATIONS

Ohlins Owner's Manual, Ohlins USA, Inc., 2002 (https://www.ohlins.com/document/11982/).

(Continued)

*Primary Examiner* — Thomas W Irvin
(74) *Attorney, Agent, or Firm* — thyssenkrupp North America, LLC

(57) ABSTRACT

A shock absorber may include an elongated housing that contains damping medium, a piston rod with a first piston that divides the elongated housing into a rebound volume and a first compression volume, a second piston configured to move through a second compression volume, a third piston configured to move through a third compression volume, and a mount cap for the elongated housing. The mount cap may include a bleed circuit that leads from the third compression volume to the first compression volume. The second and third pistons may be configured so as only to be engaged when necessary to prevent the shock absorber from bottoming out in a compression stroke. A user-accessible adjuster mechanism on an outside of the shock absorber can be manipulated to close, open, or partially open the bleed circuit and thereby adjust the damping characteristics of the second and third pistons.

20 Claims, 9 Drawing Sheets

(56) References Cited

U.S. PATENT DOCUMENTS

| | | | | |
|---|---|---|---|---|
| 2008/0179148 A1* | 7/2008 | Quinn | .................... | F16F 13/06 |
| | | | | 188/322.13 |
| 2015/0192187 A1* | 7/2015 | Smith | ..................... | F16F 9/22 |
| | | | | 188/284 |
| 2015/0276006 A1* | 10/2015 | Smith | ................. | F16F 9/5126 |
| | | | | 188/284 |
| 2016/0230835 A1* | 8/2016 | Groves | ................. | F16F 9/165 |

OTHER PUBLICATIONS

Penske 8760 Series, Penske Racing Shocks, 2022 (https://f.hubspotusercontent00.net/hubfs/8000307/Resources/Parts%20Diagrams/PS-8760-BOM-WITH-CD-ADJ.pdf).

Penske 8300 Series, Penske Racing Shocks, 2022 (https://f.hubspotusercontent00.net/hubfs/8000307/Resources/Parts%20Diagrams/PS-8300RM-BOM-DRAWING.pdf).

* cited by examiner (Detail A)

USER-ADJUSTABLE MULTI-STAGE SHOCK ABSORBERS

FIELD

The present disclosure pertains to shock absorbers, including shock absorbers with damping force characteristics that are both position-dependent and adjustable.

BACKGROUND

Shock absorbers are used in vehicles to assist the vehicle in adapting to different driving conditions due to irregularities in the road such as bumps, potholes, and other road surface anomalies. Shock absorbers are also used to assist a vehicle in traveling over more extreme conditions such as off-road driving. In certain conditions, such as high-speed driving or off-road driving, for instance, the irregularities can be severe and may cause a standard shock absorber to bottom out, that is, abruptly reach its maximum compression and produce a jarring impact.

To overcome this deficiency, shock absorbers with jounce control have been developed. A jounce control shock absorber provides an elevated damping force when the shock absorber approaches the bottoming out condition. In short, damping force increases based on the position of the shock absorber during compression so as to significantly reduce or avoid a bottoming out condition. Early jounce control shock absorbers were limited in their effectiveness as such shock absorbers only provided one stage of an elevated damping force. More recent jounce control shock absorbers, such as those disclosed in U.S. Pat. No. 9,091,320 B1 entitled "MULTI-STAGE SHOCK ABSORBER" and filed Jan. 8, 2014, which is hereby incorporated by reference in its entirety, sequentially increase the damping force using a multi-stage jounce control configuration.

However, such multi-stage jounce control shock absorbers are factory-tuned and lack adjustability. For instance, a multi-stage jounce control shock absorber, particularly second and/or third compression stages of the multi-stage jounce control shock absorber, may provide too much damping force for on-road driving conditions, but not enough damping force for off-road driving conditions. Even for multi-stage jounce control shock absorbers that are tuned primarily for off-road driving conditions, there is no one-size-fits-all solution as a user of a vehicle and the shock absorbers may desire disparate levels of damping force depending on whether the vehicle is crawling rocks or traversing sand dunes, for instance.

SUMMARY

In some examples, a shock absorber may include an elongated housing or cylinder that contains damping medium, a piston rod that extends into a proximal end of the elongated housing, and a first piston that is attached to the piston rod and is disposed within the elongated housing. The first piston may divide the elongated housing into a first compression volume and a rebound volume. The first piston is configured to provide a first compression damping force during a first compression stage as the piston rod is driven into the elongated housing during a compression stroke. A piston rod valve assembly may be disposed at an end of the piston rod. A second piston may be disposed within the elongated housing and may be movable through a second compression volume during a second compression stage. The second piston may be configured to be engaged only when the piston rod reaches a first position within the elongated housing. At that point, the piston rod valve assembly is configured to engage the second piston during the second compression stage and permit damping medium to exit the second compression volume. Flow of damping medium through the first piston, the second piston, and the piston rod valve assembly during the second compression stage contribute to a second compression damping force, which provides greater resistance than the first compression damping force.

Still further, a third piston may be disposed within the elongated housing and may be movable through a third compression volume during a third compression stage. The piston rod valve assembly is configured to engage the third piston during the third compression stage and permit damping medium to exit the third compression volume. As with the second piston, the third piston may be configured to be engaged only when the piston rod reaches a second position within the elongated housing. To be clear, the third compression stage may follow sequentially after the second compression stage. Notwithstanding, flow of damping medium through the first piston, the third piston, and the piston rod valve assembly during the third compression stage contribute to a third compression damping force, which provides greater resistance than the second compression damping force. It should also be understood that the second piston can be nested relative to the third piston, and the third piston may be closer to a distal end of the elongated housing than the second piston.

The example shock absorber may include a bleed circuit for damping medium leading, in some cases directly, from the third compression volume to the first compression volume. An adjuster mechanism may be configured to adjust the second and third compression damping forces by using a valve, such as a needle and seat valve, for instance, to close, partially open, or completely open the bleed circuit. In terms of position, the adjuster mechanism may be accessible externally on the shock absorber so that a user of the shock absorber can adjust the damping characteristics of the shock absorber as desired. An adjuster knob of the adjuster mechanism is rotatable about a central axis, which central axis does not intersect any portion of the elongated housing in some examples. In terms of the effect that the bleed circuit has on damping characteristics, the second compression damping force is greatest when the bleed circuit is closed. Likewise, the third compression damping force is greatest when the bleed circuit is closed. Conversely, the second and third compression damping forces are least when the bleed circuit is open. However, in most examples the bleed circuit does not influence the damping force generated by the first piston, regardless of whether the bleed circuit is open or closed.

Furthermore, the shock absorber may include a mount cap that is fixed to and seals the distal end of the elongated housing. The mount cap may directly support the third compression volume and indirectly support the second compression volume. Indeed, the mount cap may form a base of the first compression volume and a base of the third compression volume. In some examples, the bleed circuit is disposed internally within the mount cap. In some cases, the bleed circuit is disposed completely within the mount cap so as to be formed entirely by the mount cap. What's more, the mount cap can include a threaded port for receiving the adjuster mechanism, and rotation of the adjuster mechanism may control whether the bleed circuit is closed, partially open, or completely open. The adjuster mechanism may be configurable in a multitude of various positions. In an example where the adjuster mechanism is positionable in at least ten different positions, a first of the ten positions corresponds to the bleed circuit being closed, a second of the positions corresponds to the bleed circuit being completely open, and the remaining positions correspond to degrees to which the bleed circuit is partially open. To ensure that each and every position of the adjuster mechanism impacts flow rate through the bleed circuit, a smallest cross-sectional area along a flow path of the bleed circuit may be located at the valve, even when the valve is completely open. Finally, in some cases the second piston may be closer to the proximal end of the elongated housing than any part of the mount cap when the second piston is at rest and not engaged.

The shock absorber may extend along a longitudinal axis. In some instances, a main extent of a channel of the bleed circuit is transverse to the longitudinal axis and extends radially beyond a sidewall of the first compression volume formed by the mount cap. In some cases, the channel may extend from an axial end face of the third compression volume to a cylindrical sidewall of the mount cap that bounds the first compression volume.

In some instances, the shock absorber may include a second cylinder with a reserve piston that separates a gas reservoir from a damping medium chamber. The damping medium chamber may be in fluid communication with the first compression volume. A hose can fluidically connect the second cylinder to the mount cap. It may be advantageous to make the port in the mount cap that receives the adjuster mechanism have the same design as a second port that receives the hose for the second cylinder. In some cases, these ports may be threaded O-ring boss size-8 ports, which have proven extremely reliable.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art. With respect to the drawings, it should be understood that not all components are drawn to scale. Furthermore, those having ordinary skill in the art will understand that the various examples disclosed herein should not be considered in isolation. Rather, those with ordinary skill in the art will readily understand that the disclosure relating to some examples may be combined with and/or equally applicable to the disclosure relating to other examples.

Figure 1:
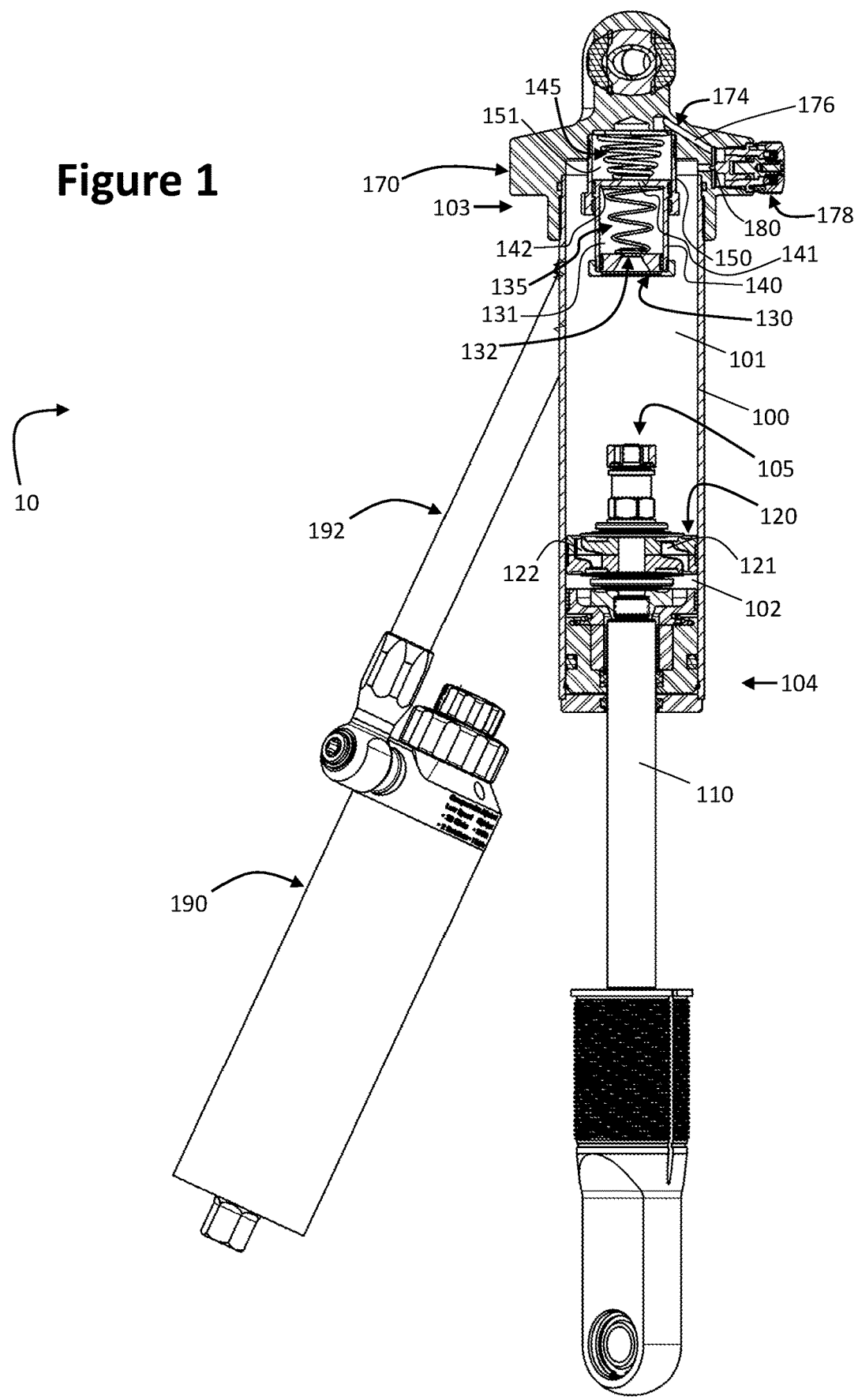
FIG. 1 is a cross-sectional view of an example shock absorber having damping force characteristics that are both position-dependent and adjustable.
Figure 2:
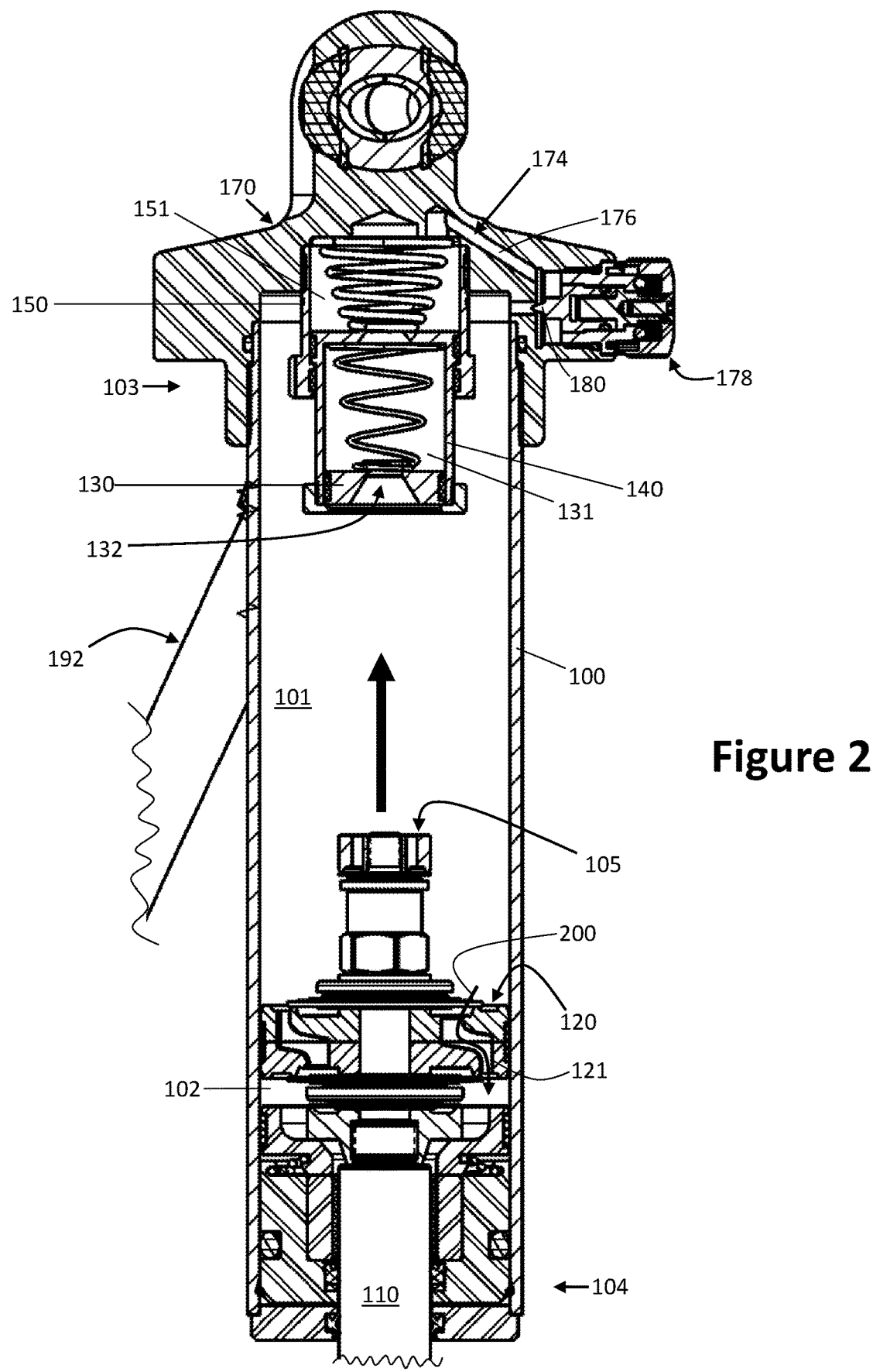
FIG. 2 is a more-detailed cross-sectional view of the shock absorber of FIG. 1, as shown during a first compression stage.

FIG. 1 is a cross-sectional perspective view of an exemplary shock absorber 10 in accordance with the present disclosure. FIG. 2 is a more-detailed view of the shock absorber 10 beginning to experience a compression stroke. In this example, the shock absorber 10 comprises an elongated housing 100 (or "first cylinder") with a first piston 120 coupled to a piston rod 110 forming a primary piston assembly. The first piston 120 is slidably received within an inner diameter of the elongated housing 100. The first piston 120 separates an internal volume of the elongated housing 100 into a first compression volume 101 located between the first piston 120 and a distal end 103 of the shock absorber 10 and a rebound volume 102 located between the first piston 120 and a proximal end 104 of the shock absorber 10.

The first piston 120 may include valves 121 and 122. One of the valves 121 may permit damping medium to flow from the first compression volume 101 to the rebound volume 102, whereas the other valve 122 may permit damping medium to flow from the rebound volume 102 to the first compression volume 101. An end of the first piston 120 may comprise a piston rod valve assembly 105 that engages a second piston 130 as the piston rod 110 moves in a compressive direction towards the distal end 103 of the shock absorber 10. The piston rod valve assembly 105 controls the flow of damping medium through one or more apertures in the second piston 130 and a flask 140. For reasons discussed below, the flask 140 may alternatively be referred to as a third piston 140.

Also disposed within the elongated housing 100 are the flask 140 and a cup 150, with the flask 140 housing the second piston 130 and the cup 150 housing the third piston 140. The second piston 130 is slidably received within an inner diameter of the flask 140. The second piston 130 may form a second compression volume 131 within the flask 140. The second piston 130 may comprise at least one aperture 132 through which damping medium may flow as the second piston 130 moves in a compressive direction.

Also disposed within the flask 140 is a first return spring 135. In the depicted example, the first return spring 135 is a conical spring that reduces to a thickness of its wire diameter upon compression. However, it should be understood by one having ordinary skill in the art that other types of springs are usable as the first return spring 135, including, for example, wave springs, Belleville springs, and the like. The first return spring 135 provides an expansive force on the second piston 130 and returns the second piston 130 to its initial position when the piston rod 110 moves in an expansive direction, counter to the compressive direction.

The flask 140 is disposed at least partially in the cup 150. The flask 140 is slidably received within an inner diameter of the cup 150 and acts as a third piston. A bottom 142 of the flask 140 may help form a third compression volume 151, which is located within the cup 150. The bottom 142 of the flask 140 may comprise one or more apertures 141 through which damping medium may flow as the third piston 140 moves in the compressive direction. In some examples, the cup 150 may be integral with the elongated housing 100. Also disposed within the cup 150 is a second return spring 145. In the example in FIGS. 1 and 2, the second return spring 145 is a conical spring that reduces to a thickness of its wire diameter upon compression. As with the first return spring 135, alternative spring types can be used for the second return spring 145. The second return spring 145 provides an expansive force on the flask 140 and returns the third piston 140 to its initial position when the piston rod 110 moves in the expansive direction.

Furthermore, the distal end 103 of the elongated housing 100 of the shock absorber 10 may be disposed in and/or affixed to a mount cap 170 that seals the elongated housing 100 and supports the cup 150, in some cases directly. The mount cap 170 may provide support for the flask 140 as well, at least indirectly via the cup 150. The mount cap 170 and the cup 150 may be secured to one another so as to fluidically seal the first compression volume 101 off from the third compression volume 151 in the cup 150. The mount cap 170 may contain, in some cases completely and internally, or at least help form a bleed circuit 174 that allows damping medium to pass from the second and third compression volumes 131, 151 in the cup 150 to the first compression volume 101 in the elongated housing 100 when the bleed circuit 174 is open. In some examples, the bleed circuit 174 may comprise a channel 176 that extends from the third compression volume 151 to the first compression volume 101.

As explained in more detail further below, the mount cap 170 may receive an adjuster mechanism 178 that is accessible externally relative to the shock absorber 10 and that includes a valve 180 for adjusting a flow cross-sectional area of the channel 176. Via rotating the adjuster mechanism 178, the valve 180 may be positionable in a plurality of positions, which allow for different flow rates through the bleed circuit 174. In some examples, the adjuster mechanism 178 and thus the valve 180 can assume ten or more different positions, including a first position where the channel 176 is completely closed, a second position where the channel 176 is completely open, and at least eight other positions where the degree to which the channel 176 is open varies. In some examples, the adjuster mechanism 178 and the valve 180 may only assume two positions, including an open position and a closed position. In still other examples, the adjuster mechanism 178 and the valve 180 may assume three positions, including a closed position, an open position, and a partially open position. Either way, those having ordinary skill in the art will understand that the valve 180 may take a variety of forms, such as a needle-and-seat valve, a butterfly valve, a shim valve, or a ball valve, for example and without limitation.

In some instances, the valve 180 and the channel 176 of the bleed circuit 174 may be configured such that even when the valve 180 is completely open, a cross-sectional flow area of the channel 176 is least—and thus most restricted—at the valve 180. This configuration is advantageous because it ensures that all positions of the valve 180 cause a different flow rate through the bleed circuit 174 and that the flow rate will not be uncontrollably or inadvertently restricted based on, for example, a diameter at some other location along a path through the channel 176.

The example shock absorber 10 may also include a second cylinder 190 in which a reserve piston separates a gas reservoir from a damping medium chamber. A hose 192 or other fluidic channel may fluidically connect the damping medium chamber of the second cylinder 190 with the first compression volume 101 of the elongated housing 100. One having ordinary skill in the art will appreciate that the second cylinder 190 shown in FIG. 1 may in some examples resemble the second cylinder disclosed more fully in U.S. Pat. No. 9,091,320 B1 entitled "MULTI-STAGE SHOCK ABSORBER" and filed Jan. 8, 2014, which is hereby incorporated by reference in its entirety.

FIGS. 2-5 show cross-sectional views of the shock absorber 10 of FIG. 1, illustrating operation of the shock absorber 10 during a compression stroke. The following description proceeds at least initially as if the bleed circuit 174 is closed.

Figure 3:
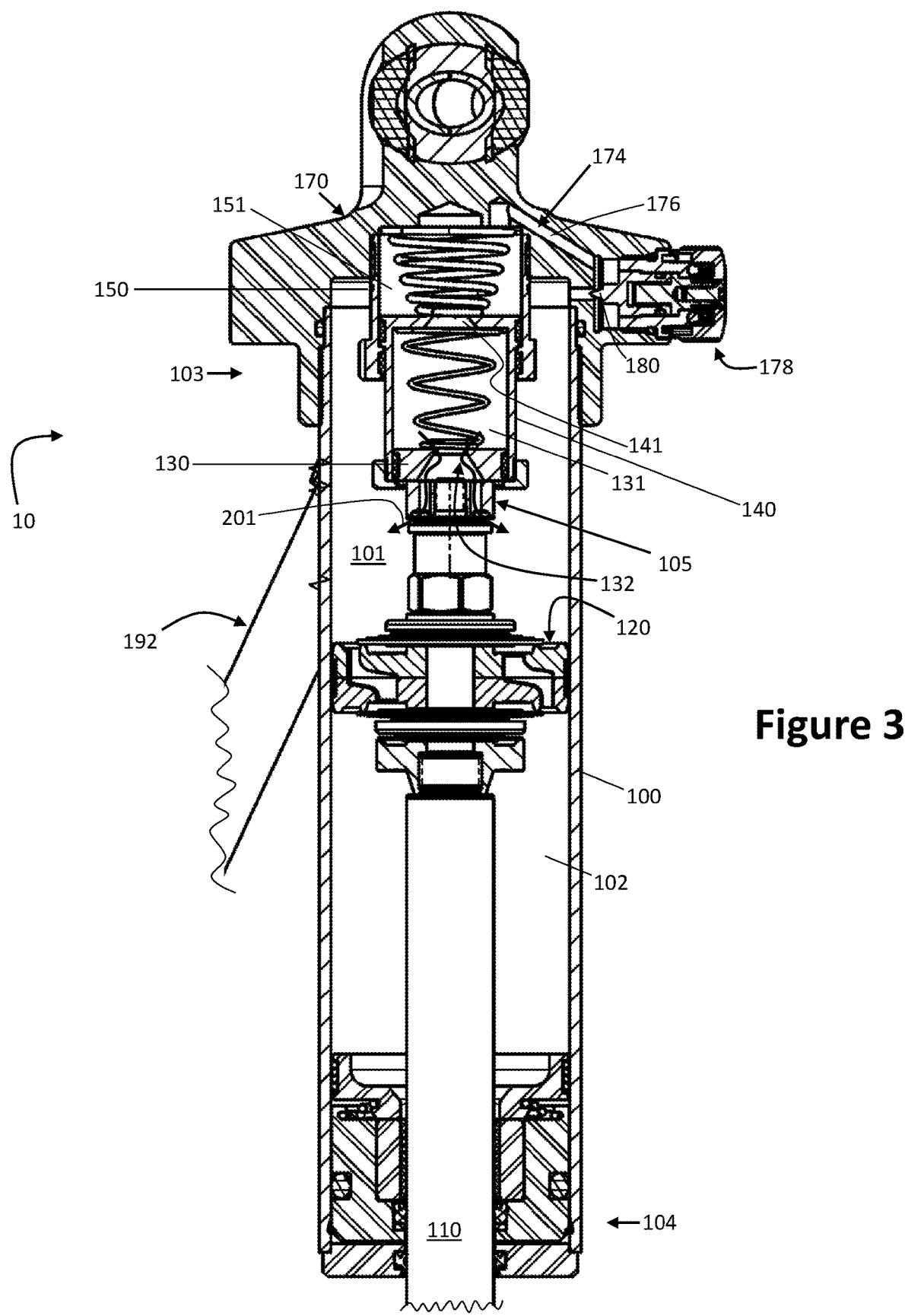
FIG. 3 is a cross-sectional view of the shock absorber of FIG. 1, as shown during commencement of a second compression stage.

As shown at least partially in FIG. 2, initially, during a first compression stage of the shock absorber 10, the piston rod 110 and the first piston 120 are driven in the compressive direction, that is, towards the distal end 103 of the elongated housing 100, over a first distance and provide a first compression damping force. During the first compression stage, the valve 121 regulates flow of damping medium from the first compression volume 101 to the rebound volume 102 as depicted by flow arrow 200. This causes the size of the first compression volume 101 to decrease and the size of the rebound volume 102 to increase, as can be seen when comparing FIGS. 2 and 3. The first compression stage continues until the piston rod valve assembly 105 engages the second piston 130 as shown in FIG. 3. One having ordinary skill in the art will recognize that the second piston 130 and the third piston 140 do not contribute to or affect the damping force until the piston rod valve assembly 105 engages the second piston 130.

Figure 4:
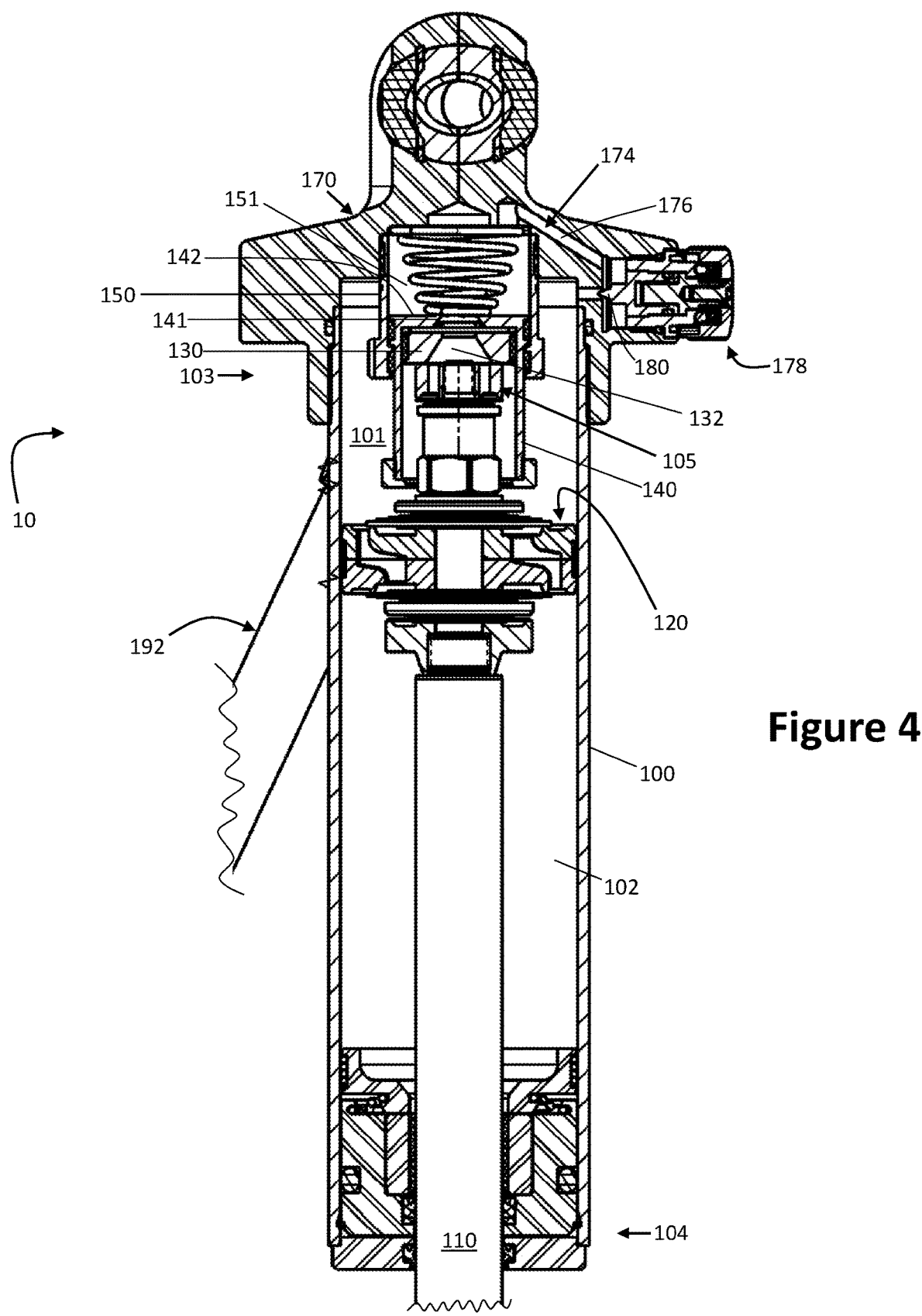
FIG. 4 is a cross-sectional view of the shock absorber of FIG. 1, as shown during commencement of a third compression stage.
Figure 5:
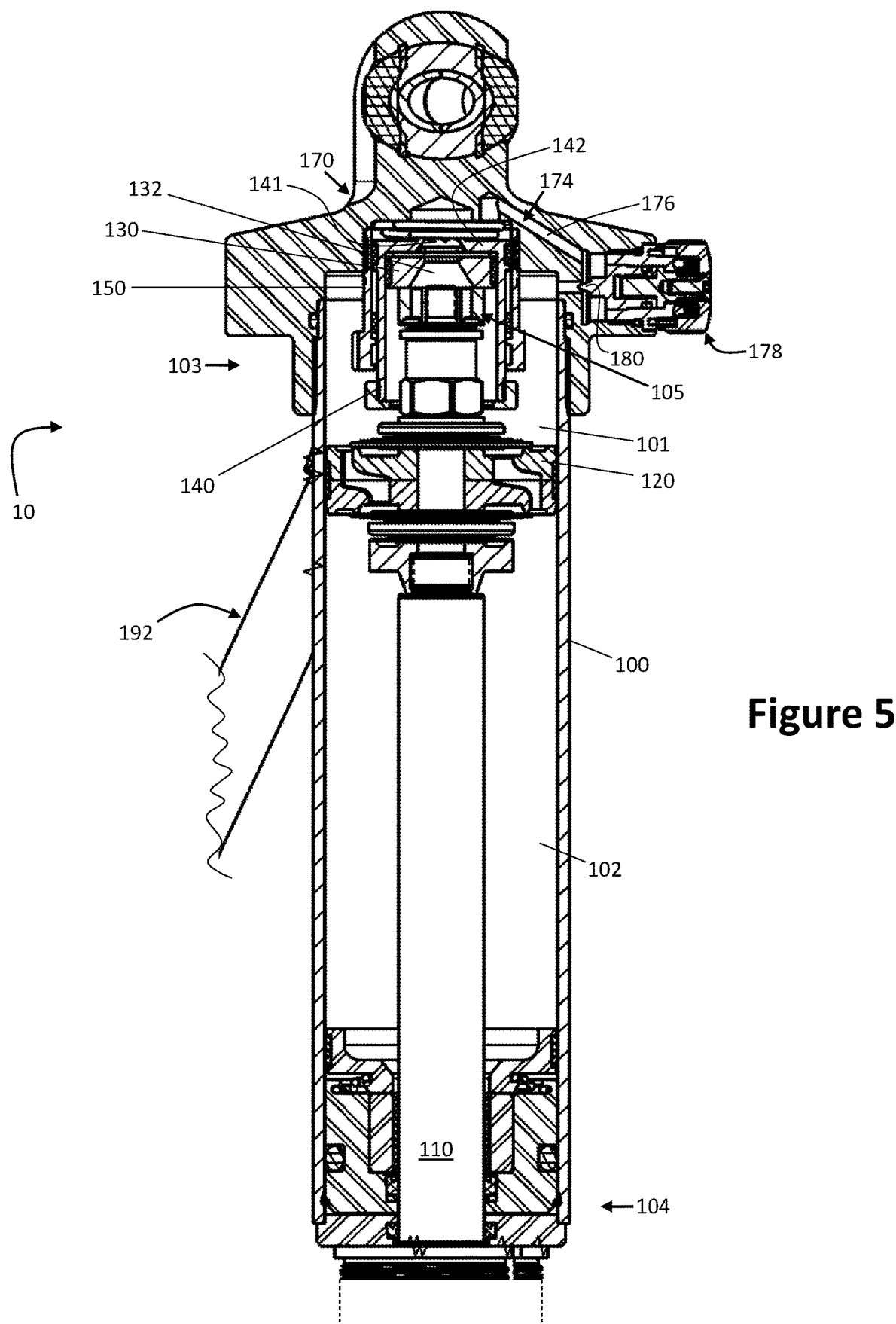
FIG. 5 is a cross-sectional view of the shock absorber of FIG. 1 in a fully compressed position.

As shown in FIG. 3, when the first piston assembly 105 compresses beyond the first distance, the piston rod valve assembly 105 engages the second piston 130 and covers the at least one aperture 132 of the second piston 130, commencing a second compression stage as the piston rod 110 moves in the compressive direction over a second distance. The piston rod valve assembly 105 seals damping medium within the second and third compression volumes 131, 151 such that, with the bleed circuit 174 closed, the only path for damping medium to escape is through the second piston 130 and the piston rod valve assembly 105. In particular, the piston rod valve assembly 105 communicates with the aperture 132 of the second piston 130 and controls the flow of damping medium through the aperture 132 as depicted by flow arrows 201. During the second compression stage, the piston rod valve assembly 105 permits damping medium to flow from the second compression volume 131 to the first compression volume 101. This in turn causes the size of the second compression volume 131 to decrease. The second compression stage continues until the second piston 130 reaches a distal end (or "bottom") of the flask 140, as shown in FIG. 4. To be clear, during the second compression stage, a combination of the flow through the first piston 120 and the flow through the second piston 130 engaged with the piston rod valve assembly 105 provides a second compression damping force that is greater than the first compression damping force.

When the second piston 130 reaches the distal end 142 of the flask 140, as shown in FIG. 4, the third compression stage begins and the flask 140, acting as the third piston, begins to move in the compressive direction over a third distance through the third compression volume 151. During this third compression stage, the piston rod valve assembly 105 controls the flow of damping medium out of the third compression volume 151 through the aperture 141 at the distal end of the flask 140. With the bleed circuit 174 closed, the only path for damping medium to escape from the third compression volume 151 is through the aperture 141 in the bottom 142 of the flask 140 and the piston rod valve assembly 105. This causes the size of the third compression volume 151 to decrease. During the third compression stage, a combination of the flow through the first piston 120 and the flow through the piston rod valve assembly 105 disposed in the aperture 141 provides a third compression damping force that is greater than the second compression damping force.

One having ordinary skill in the art will understand that the third piston 140 does not move and begin contributing resistance until the second compression volume 131 is completely drained. This follows because a diameter of the bottom 142 of the third piston 140 is greater than a diameter of the second piston 130. In other words, the third piston 140 is configured to displace a larger column of damping medium than the second piston 130. Hence the smaller second piston 130 will move completely through the second compression volume 131 before the larger third piston 140 begins to move through the third compression volume 151.

The description above concerning operation of the shock absorber 10, including the second and third compression stages, assumes that the bleed circuit 174 is closed. When the bleed circuit 174 is closed, the second and third compression stages provide the greatest amount of resistance and thus the likelihood of the shock absorber 10 bottoming out is least. As explained above, however, under certain operating conditions a user of the shock absorber 10 may not require or desire this level of resistance (or "jounce cutoff") in the second and third compression stages to prevent bottoming out. Rather, under certain operating conditions a user of the shock absorber 10 may wish to soften the level of resistance provided in the second and third compression stages. Adjusting the resistance provided by the second and third compression stages may be achieved by rotating the externally accessible adjuster mechanism 178 to at least partially open the bleed circuit 174. As one having ordinary skill in the art will understand, the greater the degree to which the bleed circuit 174 is open, the lesser the level of resistance provided in the second and third compression stages.

For instance, when the bleed circuit 174 is open and the second compression stage commences as the piston rod valve assembly 105 engages the second piston 130, damping medium begins to flow not only through the second piston 130 and the piston rod valve assembly 105 as described above, but also through the bleed circuit 174. This follows because the second compression chamber 131 is in fluid communication with the third compression chamber 151 via the aperture 141. Likewise, when the bleed circuit 174 is open and the third compression stage commences as the piston rod valve assembly 105 engages the bottom 142 of the third piston 140, damping medium flows not only through the aperture 141 and the piston rod valve assembly 105 as described above, but also through the bleed circuit 174. One having ordinary skill in the art should understand that the present disclosure is not limited to shock absorbers with three distinct compression stages, but also contemplates shock absorbers with four or more distinct compression stages.

Figure 6:
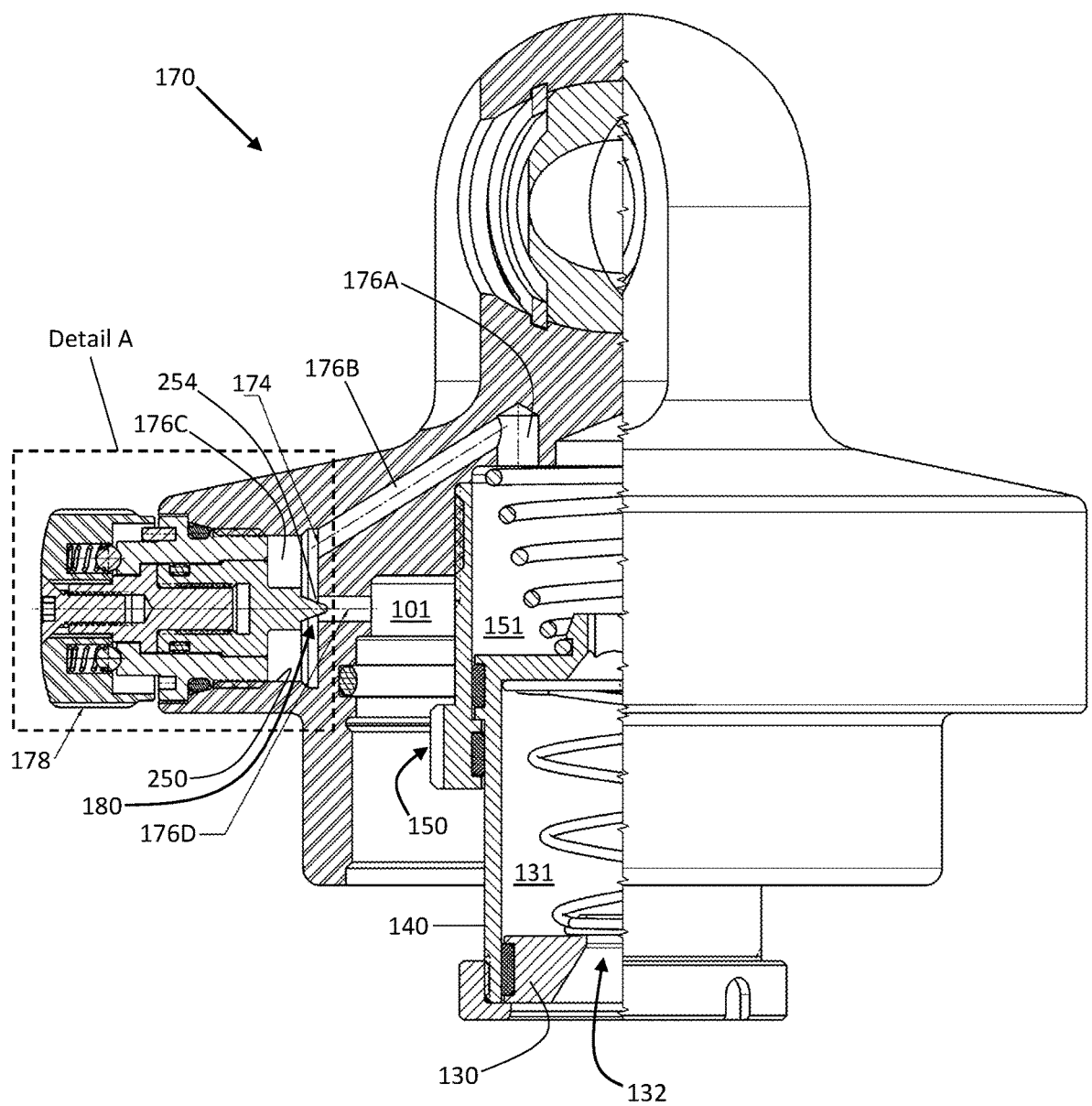
FIG. 6 is a cutaway view of an example mount cap that can be used in connection with the shock absorber of FIG. 1.
Figure 7:
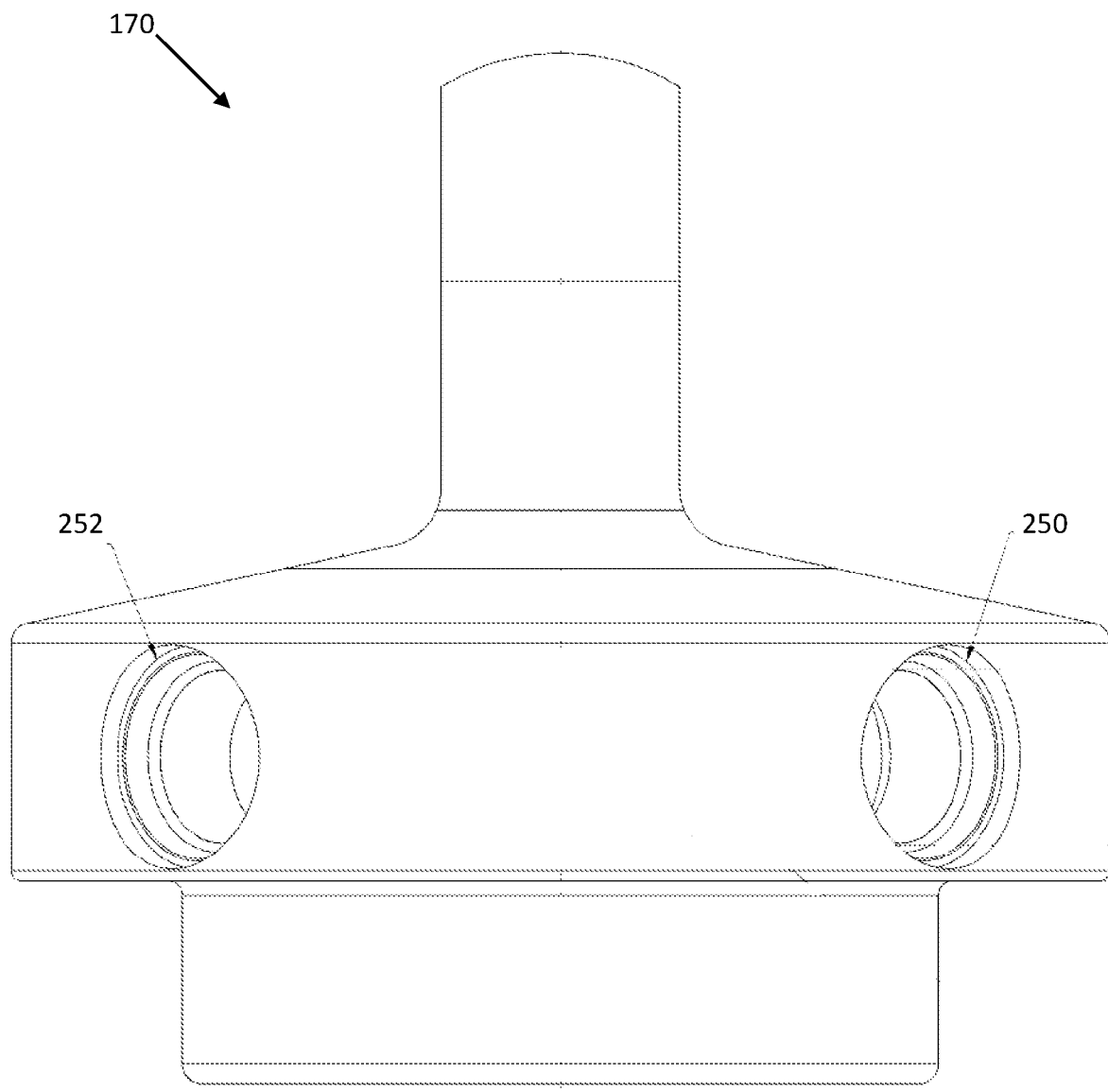
FIG. 7 is a side view of the mount cap shown in FIG. 6.

As shown in more detail in FIG. 6, the adjuster mechanism 178 can be received in a port 250 of the mount cap 170. The port 250 may be threaded in some cases. In some examples, the port 250 may be an O-ring boss (ORB) size-8 as specified more fully in SAE J1926-1. Further, FIG. 7 illustrates that the port 250 for the adjuster mechanism 178 and a port 252 on the mount cap 170 for the hose 192 connecting the second cylinder 190 may share the same design. For instance, the port 252 for the hose 192 may also be an O-ring boss (ORB) size-8 as specified in SAE J1926-1. These types of threaded ports have proven very reliable. Moreover, causing the port 250 to have the same design as the port 252 allows for these ports 250, 252 to be formed with the same tool, thereby simplifying the manufacturing process.

With continued reference to FIG. 6, the example channel 176 of the bleed circuit 174 may include various sections, including an opening 176A leading directly from the third compression volume 151, a main extent 176B, a chamber 176C adjacent to and surrounding the valve 180, and a return passage 176D that leads to the first compression volume 101. As explained in more detail below, depending on the rotational position of the adjuster mechanism 178, the valve 180 may control the degree to which a path 254 leading from the chamber 176C to the return passage 176D—and hence the bleed circuit 174 generally—is open, if at all.

Figure 8:
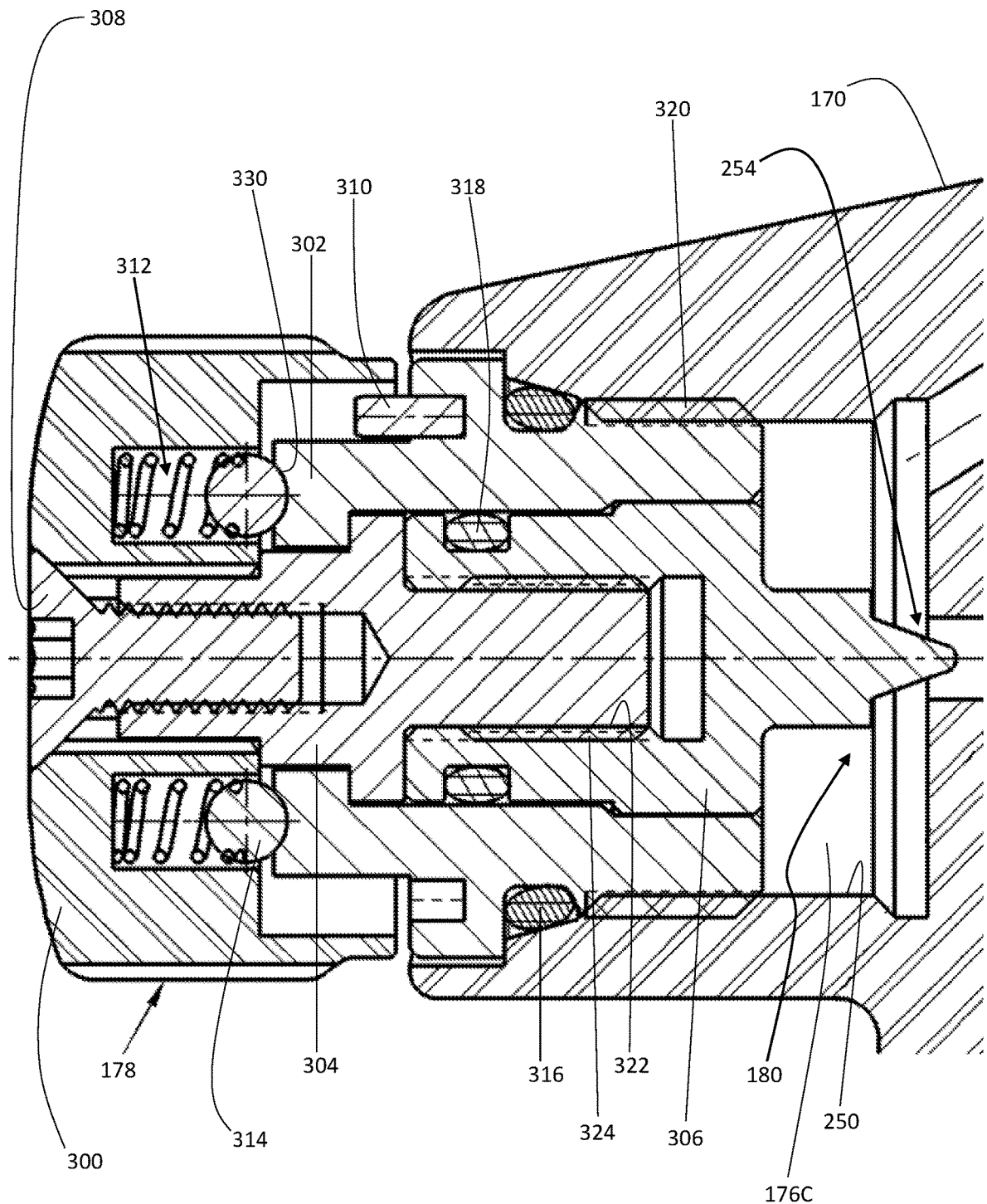
FIG. 8 is detail cross-sectional view of an example adjuster mechanism disposed in a port of a mount cap.
Figure 9:
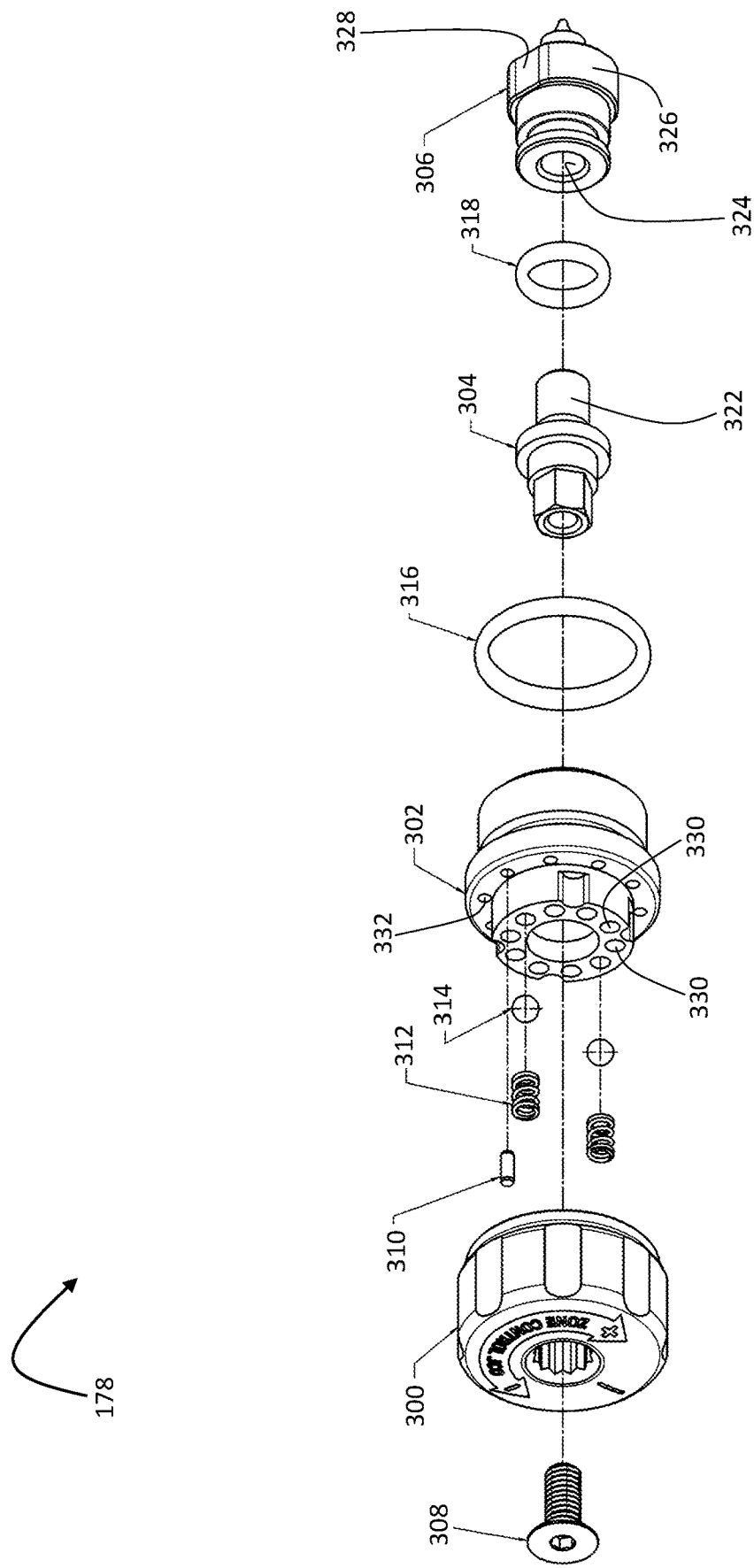
FIG. 9 is an exploded view of the adjuster mechanism shown in FIG. 8.

Turning now to FIGS. 8 and 9, the adjuster mechanism 178 is shown in closer detail in the port 250 of the mount cap 170 in FIG. 8, while FIG. 9 illustrates an exploded view of the example adjuster mechanism 178. The example adjuster mechanism 178 may generally include an adjuster knob 300, an adjuster housing 302, a drive screw 304, a valve needle 306, a retaining screw 308, a hard stop pin 310, one or more detent springs 312, one or more detent balls 314, a housing seal 316, and a needle seal 318. The adjuster housing 302 may be fixed to the port 250 of the mount cap 170. In examples where the adjuster housing 302 is coupled to the port 250 via threads 320, Loctite or some other fixing means may be applied so as to prevent rotation of the adjuster housing 302 relative to the port 250. Pressurization of damper medium in the shock absorber 10, which in turn generates friction in the threads 320, may also help prevent the adjuster housing 302 from backing out of the port 250. One having ordinary skill in the art will understand that the housing seal 316 helps prevent damping medium from passing between the port 250 and the adjuster housing 302.

To adjust flow of damping medium through the bleed circuit 174 and thus the damping characteristics of the shock absorber 10, a user of a vehicle can rotate the adjuster knob 300. Because the adjuster knob 300 is fixed to the drive screw 304 by way of the retaining screw 308, the drive screw 304 also begins to rotate with the adjuster knob 300. External threads 322 of the drive screw 304 may engage with internal threads 324 of the valve needle 306. However, the valve needle 306 may have a portion 326 with a noncircular cross section 328. An internal portion of the adjuster housing 302 that mates with the portion 326 likewise has a noncircular cross section and prevents the valve needle 306 from rotating with the drive screw 304. Consequently, the valve needle 306 is forced to translate farther in or out of the port 250, thereby decreasing or increasing a size of the path 254 through or by the valve 180 of the bleed circuit 174. Meanwhile, the needle seal 318 helps prevent damping medium from passing between the valve needle 306 and the adjuster housing 302.

The detent springs 312 in this example bias the detent balls 314 into recesses 330 in the adjuster housing 302. The force associated with this biasing must be overcome to rotate the adjuster knob 300, which helps prevent the adjuster knob 300 from rotating inadvertently. The recesses 330 in the adjuster housing 302 that receive the detent balls 314 predefine a plurality of positions at which the adjuster knob 300 can be set, as these positions are associated with varying levels of damping force. Furthermore, the hard stop pin 310 can be disposed in one of a plurality of holes 332. The hard stop pin 310 may be configured, in certain positions, to contact a protrusion within the adjuster knob 300 so as to delimit the bounds of the adjuster mechanism 178 and prevent the adjuster knob 300 from rotating more than one complete revolution, for example.

It should be readily understood that selection of the dimensions for the housing and valves configurations enable a shock designer to change the corresponding damping forces provided. The damping forces usable for a particular automotive or other application are determined based upon, for example, the weight of the vehicle, type of suspension, and intended application. Exemplary ranges for damping forces for first, second, and third compression damping forces include, for example, 0.6 kN-2.0 kN, 4.0 kN-8.0 kN, and 8.0 kN-12.0 kN, respectively. Likewise, exemplary ranges for the first, second, and third compression distances from full compression include for example, 150 mm-300 mm, 35 mm-70 mm, and 0 mm-35 mm, respectively. The damping force for each compression stage may be chosen by optimizing or altering the components of the shock absorber described herein. For instance, the damping force can be controlled by the valve disc selection in pistons 120 and 105. Also, the damping force in the third compression stage can be controlled by modifying the internal diameters of the flask 140 and cup 150. The engagement point of the second piston 130 to the piston rod valve assembly 105 or the engagement point of the second piston 130 to the bottom 142 of the flask 140 can be used to alter damping force timing.

What is claimed is:

1. A shock absorber comprising:
   an elongated housing that contains damping medium;
   a piston rod that extends into the elongated housing;
   a first piston that is attached to the piston rod and is disposed within the elongated housing, the first piston dividing the elongated housing into a first compression volume and a rebound volume, wherein the first piston is configured to provide a first compression damping force during a first compression stage as the piston rod is driven into the elongated housing;
   a piston rod valve assembly disposed at an end of the piston rod;
   a second piston disposed within the elongated housing, the second piston being movable through a second compression volume during a second compression stage, wherein the piston rod valve assembly is configured to engage the second piston during the second compression stage and permit damping medium to exit the second compression volume, wherein flow of damping medium through the first piston, the second piston, and the piston rod valve assembly during the second compression stage contribute to a second compression damping force, wherein the second compression damping force provides greater resistance than the first compression damping force;
   a third piston disposed within the elongated housing, the third piston being movable through a third compression volume during a third compression stage, wherein the piston rod valve assembly is configured to engage the third piston during the third compression stage and permit damping medium to exit the third compression volume, wherein flow of damping medium through the first piston, the third piston, and the piston rod valve assembly during the third compression stage contribute to a third compression damping force, wherein the third compression damping force provides greater resistance than the second compression damping force;
   a bleed circuit for damping medium leading from the third compression volume to the first compression volume; and
   an adjuster mechanism configured to adjust the second and third compression damping forces by causing the bleed circuit to be closed, partially open, or completely open, with the adjuster mechanism being accessible externally on the shock absorber.

2. The shock absorber of claim 1 wherein the second compression damping force is greater when the bleed circuit is closed than when the bleed circuit is partially or completely open, wherein the bleed circuit leads directly from the third compression volume to the first compression volume.

3. The shock absorber of claim 1 comprising a mount cap that is fixed to a distal end of the elongated housing, wherein the mount cap directly supports the third compression volume and indirectly supports the second compression volume, wherein the bleed circuit is disposed internally within the mount cap.

4. The shock absorber of claim 1 comprising a mount cap that is fixed to a distal end of the elongated housing, wherein the bleed circuit is disposed completely and internally within the mount cap, wherein the mount cap includes a port for receiving the adjuster mechanism, wherein the adjuster mechanism is configured such that rotation of the adjuster mechanism controls whether the bleed circuit is closed, partially open, or completely open.

5. The shock absorber of claim 4 wherein the adjuster mechanism is configurable in at least ten different positions, wherein a first of the at least ten different positions corresponds to the bleed circuit being closed, wherein a second of the at least ten different positions corresponds to the bleed circuit being completely open, wherein eight of the at least ten different positions correspond to degrees to which the bleed circuit is partially open.

6. The shock absorber of claim 1 comprising:
   a mount cap that is fixed to a distal end of the elongated housing, wherein the bleed circuit is disposed internally within the mount cap; and
   a second cylinder with a reserve piston that separates a gas reservoir from a damping medium chamber; and
   a hose that fluidically connects the second cylinder to the mount cap,
   wherein the mount cap contains a first port for receiving the adjuster mechanism and a second port for receiving the hose, wherein the first port is the same type of port as the second port.

7. The shock absorber of claim 6 wherein both the first and second ports are threaded O-ring boss ports.

8. The shock absorber of claim 1 wherein the adjuster mechanism and the bleed circuit form a needle and seat valve for opening and closing the bleed circuit.

9. A shock absorber comprising:
   a cylinder that contains damping medium, the cylinder having a proximal end and a distal end;
   a piston rod that extends into the proximal end of the cylinder;
   a first piston that is attached to the piston rod and is disposed within the cylinder, the first piston dividing the cylinder into a first compression volume and a rebound volume, the first piston configured to generate a compression damping force;

a piston rod valve assembly disposed at an end of the piston rod that is disposed within the cylinder;

a second piston configured to move through a second compression volume and a third piston configured to move through a third compression volume, the second and third pistons disposed near the distal end within the cylinder, with the second piston being nested relative to the third piston and with the third piston being closer to the distal end of the cylinder than the second piston, wherein the piston rod valve assembly is configured to sequentially engage the second and third pistons to generate additional compression damping force to resist a compression stroke of the piston rod;

a mount cap disposed at the distal end of the cylinder, with the mount cap forming a base of the first compression volume and a base of the third compression volume, wherein the mount cap contains a bleed circuit for damping medium leading from the third compression volume to the first compression volume; and an adjuster mechanism configured to adjust an amount of resistance provided by the second and third pistons by opening and closing the bleed circuit, with the adjuster mechanism being accessible externally on the shock absorber.

10. The shock absorber of claim 9 wherein the bleed circuit comprises a channel that is completely contained within the mount cap and that extends from an axial end face of the third compression volume to a cylindrical sidewall of the mount cap that bounds the first compression volume.

11. The shock absorber of claim 9 wherein the adjuster mechanism is received in a first port of the mount cap, wherein the mount cap has a second port with the same design as the first port.

12. The shock absorber of claim 9 wherein the compression damping force generated by the first piston is the same regardless of whether the bleed circuit is open or closed.

13. The shock absorber of claim 9 extending along a longitudinal axis, wherein a main extent of a channel of the bleed circuit is transverse to the longitudinal axis and extends radially beyond a sidewall of the first compression volume formed by the mount cap.

14. A shock absorber comprising:
an elongated housing containing damping medium;
a first piston disposed on a piston rod that extends into the elongated housing, the first piston configured to provide resistance to a compression stroke of the piston rod;

a second piston and a third piston that are configured to provide additional resistance to the compression stroke of the piston rod to prevent the piston rod from bottoming out within the elongated housing, wherein the second piston is configured to be engaged only when the piston rod reaches a first position within the elongated housing, wherein the third piston is configured to be engaged only when the piston rod reaches a second position within the elongated housing; and a valve for closing, partially opening, and completely opening a bleed circuit to adjust the additional resistance provided by the second and third pistons, wherein a position of the valve can be controlled from outside of the shock absorber.

15. The shock absorber of claim 14 wherein the bleed circuit is formed entirely by a mount cap that is disposed on and seals a distal end of the elongated housing.

16. The shock absorber of claim 14 comprising an adjuster mechanism for controlling the position of the valve, wherein the adjuster mechanism is received in a threaded port of a mount cap that is disposed on and seals a distal end of the elongated housing.

17. The shock absorber of claim 16 wherein the valve is a needle and seat valve that translates towards and away from a longitudinal axis along which the elongated housing extends, wherein rotation of the adjuster mechanism causes translation of a needle of the needle and seat valve.

18. The shock absorber of claim 16 wherein at least an adjuster knob of the adjuster mechanism is configured to rotate about a central axis, wherein the central axis does not intersect any portion of the elongated housing.

19. The shock absorber of claim 16 wherein the elongated housing has a proximal end and a distal end, with the bleed circuit being disposed at the distal end, wherein the second piston is closer to the proximal end of the elongated housing than any part of the mount cap when the second piston is at rest and not engaged.

20. The shock absorber of claim 14 wherein along a flow path through the bleed circuit, a smallest cross-sectional area of the bleed circuit is located at the valve, even when the valve is completely open.

\* \* \* \* \*